Patented Feb. 4, 1936

2,029,605

UNITED STATES PATENT OFFICE 2,029,605

REFINING OF SOUTH TEXAS LUBRICATING OIL

Wilson Hull Beardsley, Houston, Tex., assignor to Sinclair Refining Company, New York, N. Y., a corporation of Maine No Drawing. Application March 9, 1932, Serial No. 597,810

1 Claim. (Cl. 196—40)

My invention relates to improvements in the manufacture of lubricating oils. More particularly, my invention relates to improvements in the treatment with sulphuric acid of lubricating oil stocks derived from South Texas type crudes.

One conventional treatment to which lubricating oil stocks are commonly subjected comprises agitation of the oil with sulphuric acid followed by separation of the sludge formed assisted by the addition of water. This treatment requires skilful manipulation in every case, but no unusual difficulties are encountered where the oil has a sufficiently low acid number. Lubricating stocks derived from South Texas crudes, however, frequently have a high acid number and, as applied to such oils, the treatment has involved both difficulties and prejudices. The use of too much water, to induce the sludge separation, or "acid break", tends to decompose the sludge and to introduce or reintroduce objectionable constituents into the oil. In the treatment of oils having a high acid number, the addition of water tends to involve emulsification, and the addition of water has in such cases been further limited for this reason. In general the art has regarded it necessary to reduce the acid number to some value not exceeding about 0.2 by some preliminary treatment such as distillation with caustic soda, in the treatment of South Texas type stocks having a higher acid number, and to limit the addition of water not to exceed a fraction of one per cent by volume on the oil.

In referring to "lubricating oils" and "lubricating stocks", I refer to oils and oil stocks having viscosities upwards of 100 at 100° F. (Saybolt Universal). In referring to "acid number", I refer to the number of milligrams of potassium hydroxide required to neutralize one gram of the oil using phenolphthalein as the indicator (A. S. T. M. Tentative Standard D 188—27—T 1925–1931).

I have discovered that the difficulties involved and believed to be involved in the treatment with sulphuric acid of lubricating oil stocks derived from South Texas crudes and having an acid number exceeding 0.2 are avoided if sufficient water is used to assist the separation of the sludge formed. The amounts of water used in accordance with my invention are substantially larger than those hitherto used. I find the use of water in amounts approximating 1.5–3.0 per cent by volume on the oil particularly advantageous in the treatment of stocks of this type. I have been able successfully and regularly thus to treat stocks derived from South Texas crudes having acid numbers as high as 0.5–0.7 and higher without impairing the quality of the stock treated in any respect. At the same time I have been able to develop marked economies, for example, in the amount of caustic soda required in preliminary treatment. My invention may be carried out just as the conventional treatment is carried out except in that a substantially larger amount of water is used to assist the separation of sludge formed and in that it is applicable to stocks having acid numbers exceeding 0.2 or thereabouts. In one aspect my invention comprises, in combination, a preliminary neutralization treatment insufficient to reduce the acid number of the stock to 0.2 or less, distillation with 1–2 pounds of caustic soda per barrel of oil as compared to 6–8 pounds per barrel for example, and a sulphuric acid treatment in which the amount of water used to assist the separation of the sludge formed approximates 1.5–3.0 per cent by volume on the oil. My invention may be practiced in any conventional apparatus.

I claim:

In the refining of South Texas lubricating oil stocks having an acid number substantially exceeding 0.2 with sulphuric acid, the improvement which comprises subjecting the oil to a preliminary neutralization treatment insufficient to reduce the acid number of the oil to 0.2, thereafter subjecting the oil to treatment with sulphuric acid and adding an amount of water approximating 1.5–3.0% by volume on the oil to assist the separation of the sludge formed.

WILSON HULL BEARDSLEY.